United States Patent
Ionfrida et al.

(10) Patent No.: US 8,239,830 B2
(45) Date of Patent: Aug. 7, 2012

(54) SYSTEM FOR PORTAL ARCHITECTURE

(75) Inventors: Nicola Ionfrida, Milan (IT); Paolo Cardinale, Milan (IT)

(73) Assignee: Accenture Global Services Limited, Dublin (IE)

( * ) Notice: Subject to any disclaimer, the term of this patent is extended or adjusted under 35 U.S.C. 154(b) by 1531 days.

(21) Appl. No.: 11/703,857

(22) Filed: Feb. 8, 2007

(65) Prior Publication Data

US 2008/0109276 A1  May 8, 2008

(30) Foreign Application Priority Data

Nov. 3, 2006 (EP) .................................... 06022910
Nov. 3, 2006 (IT) .............................. MI2006A2104

(51) Int. Cl.
*G06F 9/44* (2006.01)

(52) U.S. Cl. ......... 717/121; 717/104; 717/116; 717/120

(58) Field of Classification Search ........................ None
See application file for complete search history.

(56) References Cited

U.S. PATENT DOCUMENTS

| | | | |
|---|---|---|---|
| 7,328,282 B2 * | 2/2008 | Ganesan et al. | 709/246 |
| 7,617,481 B2 * | 11/2009 | Joe et al. | 717/106 |
| 7,774,791 B1 * | 8/2010 | Appelbaum et al. | 719/318 |
| 7,882,228 B2 * | 2/2011 | Montes De Oca et al. | 709/225 |
| 2005/0015591 A1 | 1/2005 | Thrash et al. | |
| 2005/0198121 A1 * | 9/2005 | Daniels et al. | 709/203 |
| 2005/0223392 A1 * | 10/2005 | Cox et al. | 719/328 |
| 2005/0262194 A1 * | 11/2005 | Mamou et al. | 709/203 |
| 2006/0085243 A1 * | 4/2006 | Cooper et al. | 705/8 |
| 2006/0184410 A1 * | 8/2006 | Ramamurthy et al. | 705/8 |
| 2007/0050756 A1 * | 3/2007 | Paller | 717/117 |

OTHER PUBLICATIONS

Kruger et al., "Efficient Exploration of Service-Oriented Architectures using Aspects", 2006, pp. 10.*
Nabor C. Mendonca and Clayton F. Silva, "*Aspectual Services: Unifying Service- and Aspect-Oriented Software Development*", Proceedings of the International Conference on Next Generation Web Services Practices, IEEE 2005.
Anis Charfi and Mira Mezini, "*Aspect-Oriented Web Service Composition with AO4BPEL*", pp. 168-182, ECOWS 2004.
L. Teboul, R. Pawlak, L. Seinturier, E. Gressier-Soudan and E. Becquet, "*AspectTAZ: a new approach based on Aspect Oriented Programming for Object Oriented Industrial Messaging Services design*", 4th IEEE International Workshop on Factory Communication System, 2002.
Microsoft, Patterns & Practices Digest, "Reuse Best Practices at PatternShare.org", pp. 16pp., Microsoft vol. 1, Feb. 2005.

* cited by examiner

*Primary Examiner* — Isaac Tecklu
(74) *Attorney, Agent, or Firm* — Brinks Hofer Gilson & Lione

(57) ABSTRACT

A system for a portal architecture may include a model service component. The model service component may be arranged to connect a presentation device to a business manager component. An aspect oriented architecture may be associated with the model service component. A service oriented architecture may be associated with the model service component, the service oriented architecture being arranged orthogonal to the aspect oriented architecture.

19 Claims, 7 Drawing Sheets

SYSTEM FOR PORTAL ARCHITECTURE

PRIORITY CLAIM

This application claims the benefit of EPO Application No. 06022910.1, filed Nov. 3, 2006 and Italian Application No. MI2006A002104, filed Nov. 3, 2006, both of which are incorporated herein by reference in their entirety.

BACKGROUND

A Service Oriented Architecture (SOA) framework may provide patterns for design, development, deployment and management of a loosely coupled business application infrastructure. In this framework, business functionality may be published, discovered, and consumed as part of a business system of network and reusable technical and business services. In computing, the term SOA may express a perspective of software architecture that defines the use of loose coupled software services to support the requirements of the business processes and software users. In an SOA environment, resources on a network may be made available as independent services that can be accessed without knowledge of their underlying platform implementation.

A common challenge faced using the SOA framework is the management of services and data. SOA-based environments can include many services which exchange messages to perform tasks. Depending on the design, a single application may generate millions of messages. Managing and providing information on how services interact may be a complicated task. Another challenge may be providing appropriate levels of security. Applications which consume services, particularly those external to company firewalls, may be more visible to external parties than traditional proprietary applications. The flexibility and reach of SOA may compromise security. Also, SOA may not guarantee reduced IT costs, improved systems agility or faster time to market. Successful SOA implementations may only realize some or all of these benefits depending on the quality and relevance of the system architecture and design.

BRIEF SUMMARY

A system for a portal architecture may include a model service component. The model service component may be arranged to connect a presentation device to a business manager component. An aspect oriented architecture may be associated with the model service component. A service oriented architecture may be associated with the model service component, the service oriented architecture being arranged orthogonal to the aspect oriented architecture.

These and other features and advantages of the invention will become apparent upon review of the following detailed description of the presently preferred embodiments of the invention, taken in conjunction with the appended drawings.

DETAILED DESCRIPTION

A system and architecture are disclosed that may offer users advanced levels of access to websites. For example, in the telecommunications industry, a customer may find useful information about the telecommunication company's services, products and solutions to problems through the company's website, rather than having to contact a call center of the company. To improve the service provided by the company, advanced functionality and multiple channels of access through a portal to the website may be offered to the users.

Figure 1:
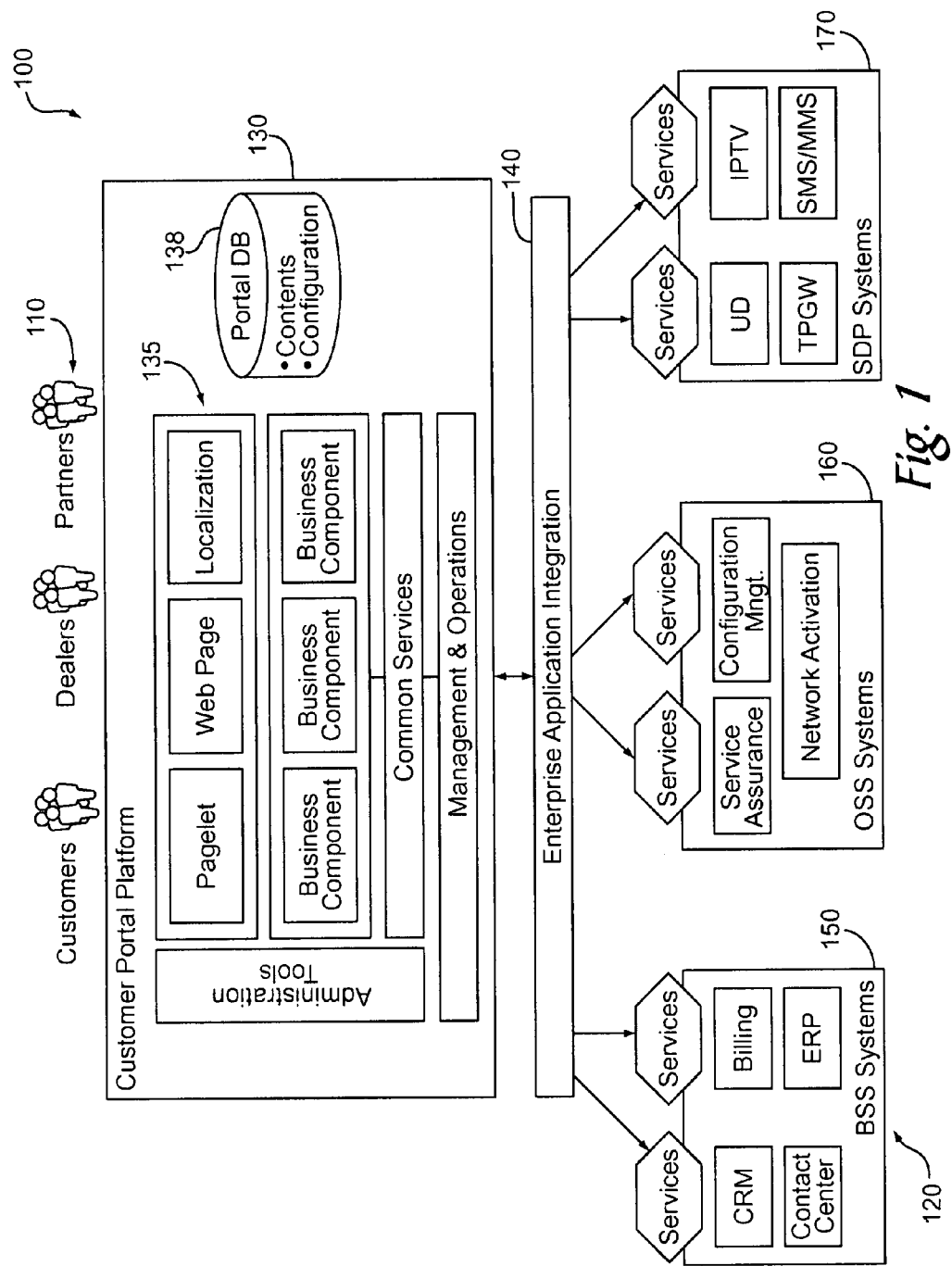
FIG. 1 is a block diagram of a customer portal system.

FIG. 1 is a block diagram of a customer portal system 100. Users 110, such as customers, dealers and partners, may access backend systems 120 through portal platform 130. The portal platform 130 includes software that acts as a network access point. The access point may include web pages that act as a starting point for using web or web-based services. The portal platform 130 may also include administration tools, business components, common services and management and operations, and any other layers 135. A portal database 138 may include content and configuration information for the portal.

The portal system 100 may connect to the backend systems 120 via a middleware application 140. The middleware application may include an enterprise application integration software that manages the connection between the client portal 130 and databases of the backend system 120. An exemplary middleware application may be BIZTALK by MICROSOFT or SERVICE BUS by TIBCO.

The backend systems 120 may include databases for different services, such as basic service set (BSS) 150, operational support systems (OSS) 160 and session description protocol (SDP) platforms 170. The BSS systems 150 may include customer relationship management (CRM), billing, enterprise resource planning (ERP) and contact centers. The OSS system 160 may include service assurance, configuration and network activation applications. The SDP platforms 170 may provide for a unified directory (UD), internet protocol television (IPTV), third party gateway (TPGW), short message service/multimedia message service (SMS/MMS), or other protocols.

Figure 2:
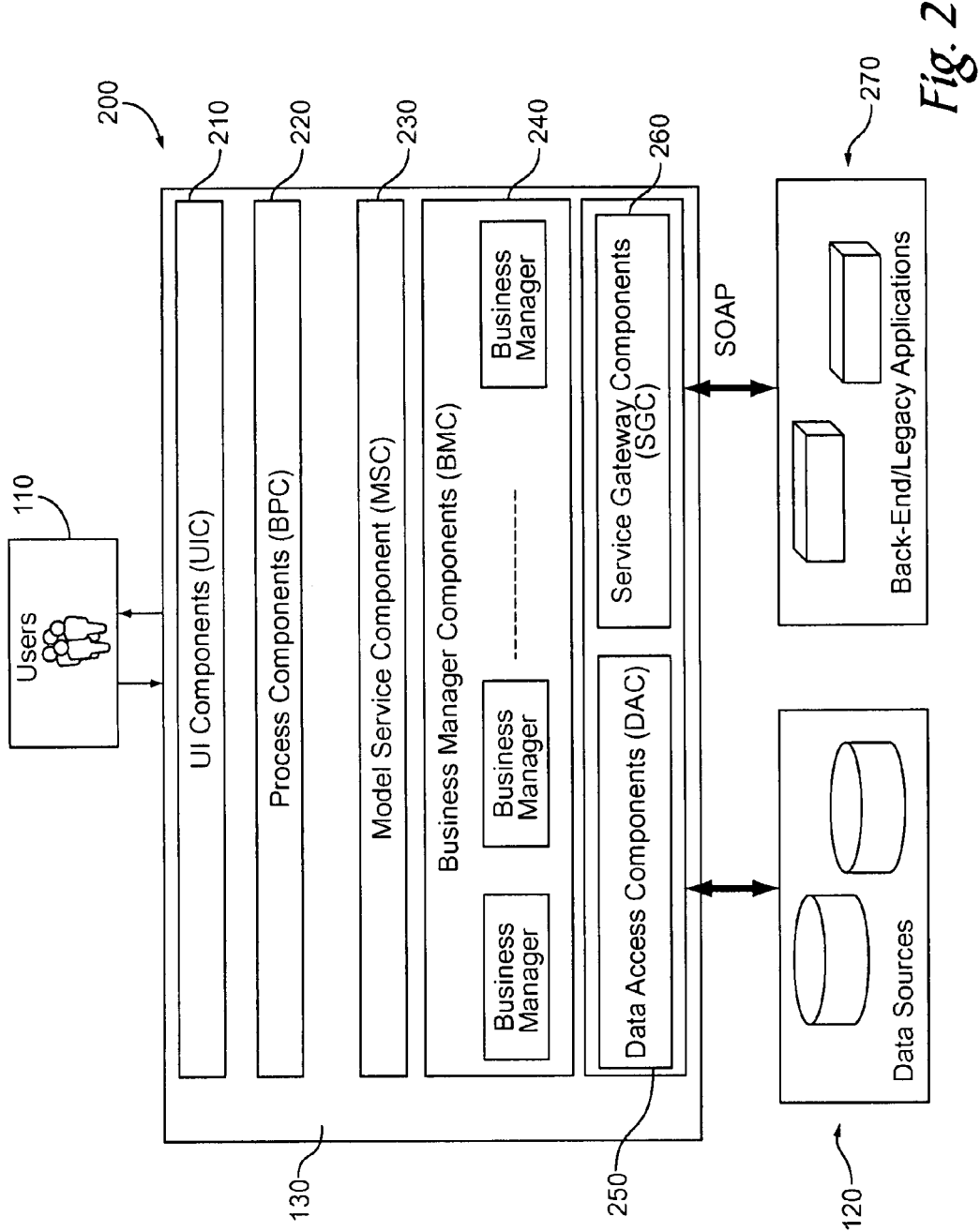
FIG. 2 is a block diagram of customer portal application layers of the portal system.

FIG. 2 is a block diagram of customer portal application layers 200 of the portal system 100. The portal application layers 200 may include a user interface (UI) component 210, a process components (BPC) 220, a model service component (MSC) 230, business manager components (BMC) 240, data access components (DAC) 250, and service gateway components (SGC) 260. The BMC may be a software module that encapsulates business logic functions. The portal application layer 200 may connect to back-end and legacy applications 270 via a protocol, such as a simple object access protocol (SOAP) or other standard for web service messages.

Regarding the layers, the UI component 210 may include defined presentation logic, such as html, css, look&feel, and images, page components, such as portlets, configuration, and any other desired interface-type components. The BPC 220 includes implemented event handler components which may define navigation logic and separate presentation from the details of the navigation. The MSC 230 handles common service implementations, such as AOP logging, caching, exception handling, data validation, and security. In addition, the MSC 230 handles access to business functions, such as those implemented by business managers as services, such as local application programming interface (API), remote API calls and web services. The MSC 230 may allow separation between presentation/navigation implementations and business logic implementations.

The MSC 230 may act as a proxy component between consumer applications or software components, such as presentation/navigation layers, and business logic components, such as BMC 240, exposing to consumers a set of APTs/services that can be invoked. In addition, the MSC 230 may perform authentication functionality to allow/deny consumer to invoke the APIs/services. The BMC 240 may allow for business functions and delivered API. A data transfer object design pattern may be implemented by BMC 240 components to separate the business logic implementation from the data encapsulation objects. Each business manager component may encapsulate business functions specific for any business entity such as customers, billing, accounts, orders, catalogs, and services. The DAC 250 and SGC 260 may allow for encapsulating logic to access data-sources and remote system, and keeping the business logic and upper layer independent from the technical aspect. They may be implemented with a SQL Server/Oracle and Web-Services/Cobra/Remote Procedure calls, or in other ways.

The MSC 230 is a component that may logically act as Facade object: the MSC 230 may separate the consumer components, as presentation/navigation components, from the business logic layer, which is implemented by BMC 240. Additionally, leveraging the Aspect Oriented Programming (AOP) paradigm, the MSC 230 may act as centralized component for implementing common logic as exception handling, logging, authentication/authorization, caching, auditing, transaction management, data validation, and others, which may require the same logic to be replicated in many components. The Aspect components of the AOP may be configured to be applicable to any business component BMC 240 with no need of additional coding. Another feature of the MSC 230 is that it may enable access to the business functions available on the BMC 240 thru different protocols: a) simple in-procedure protocol, b) using web services/SOAP protocol, c) via remote procedure call. This flexibility may enable the same set of functions to be called by local consumer components as well as remote consumer components.

Figure 3:
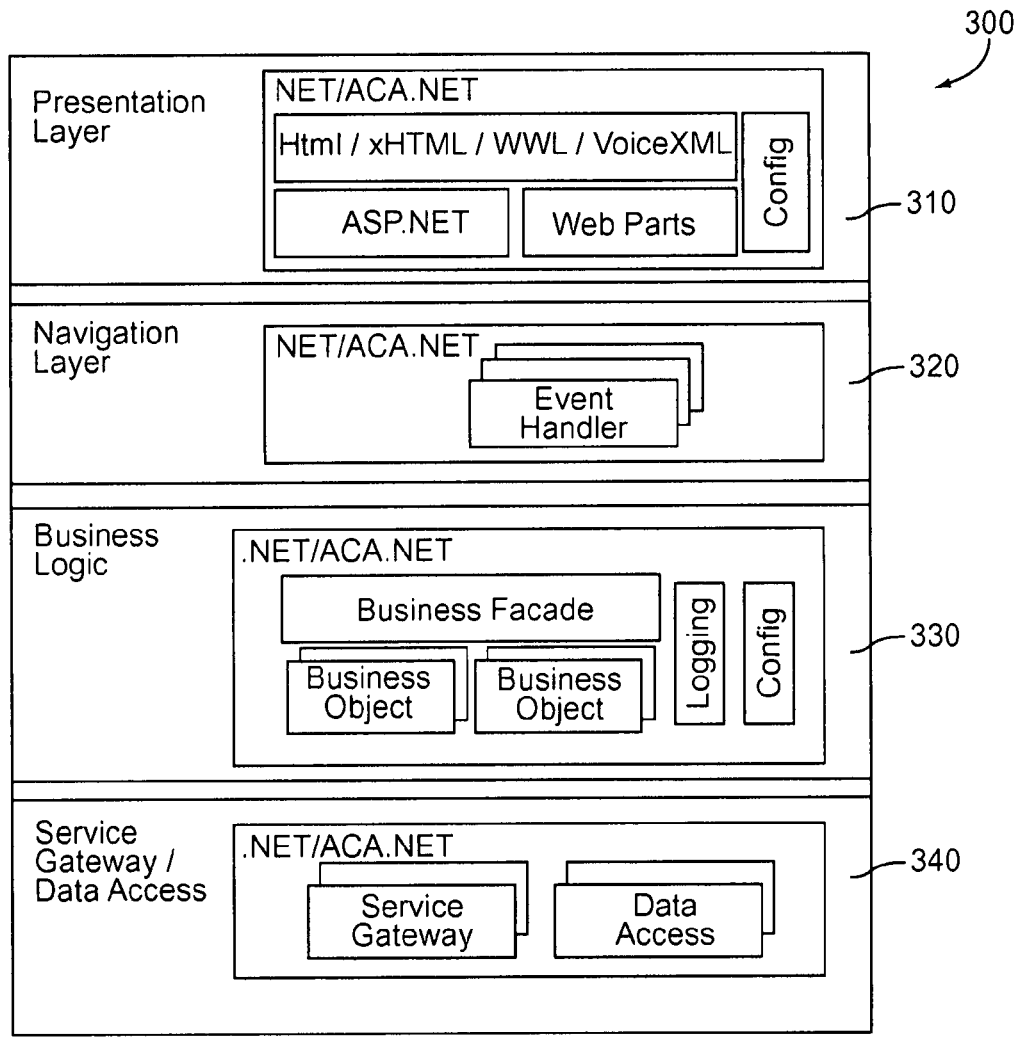
FIG. 3 is a block diagram showing more exemplary details of the layers of FIG. 2.

FIG. 3 is a block diagram showing a more detailed view of the exemplary component layers 300 of FIG. 2. The layers may be represented as a presentation layer 310, navigation layer 320, business logic 330 and service gateway/data access layer 360. The logic of the presentation layer 310 and navigation layer 320 may be kept separate to allow multi-channel delivery by adding specific presentation for the desired channels, while maintaining the same navigation logic and the other application layers. In this way, development of the layers may also be outsourced. For example, a graphic user interface (GUI) development may be outsourced to a media agency while the portal navigation and business logic may be developed in-house. The model-view-controller (MVC) paradigm for the GUI may strengthen the portal flexibility. The business component logic may be completely reusable for performing business operations, such as creating customer accounts, submitting order, etc., and modifying the presentation and/or navigation logic.

The business logic 330 and service gateway/data access 340 may be kept separate to enable portal re-usability with different back-end integration, such as BizTalk/Tibco, Geneva/Single View, SQL Server/Oracle, without having to change the portal application layers. The configuration allows for greater flexibility with less coding. Also, the arrangement allows for a high flexibility for integration with external application such as web content management system and other web applications.

Figure 4:
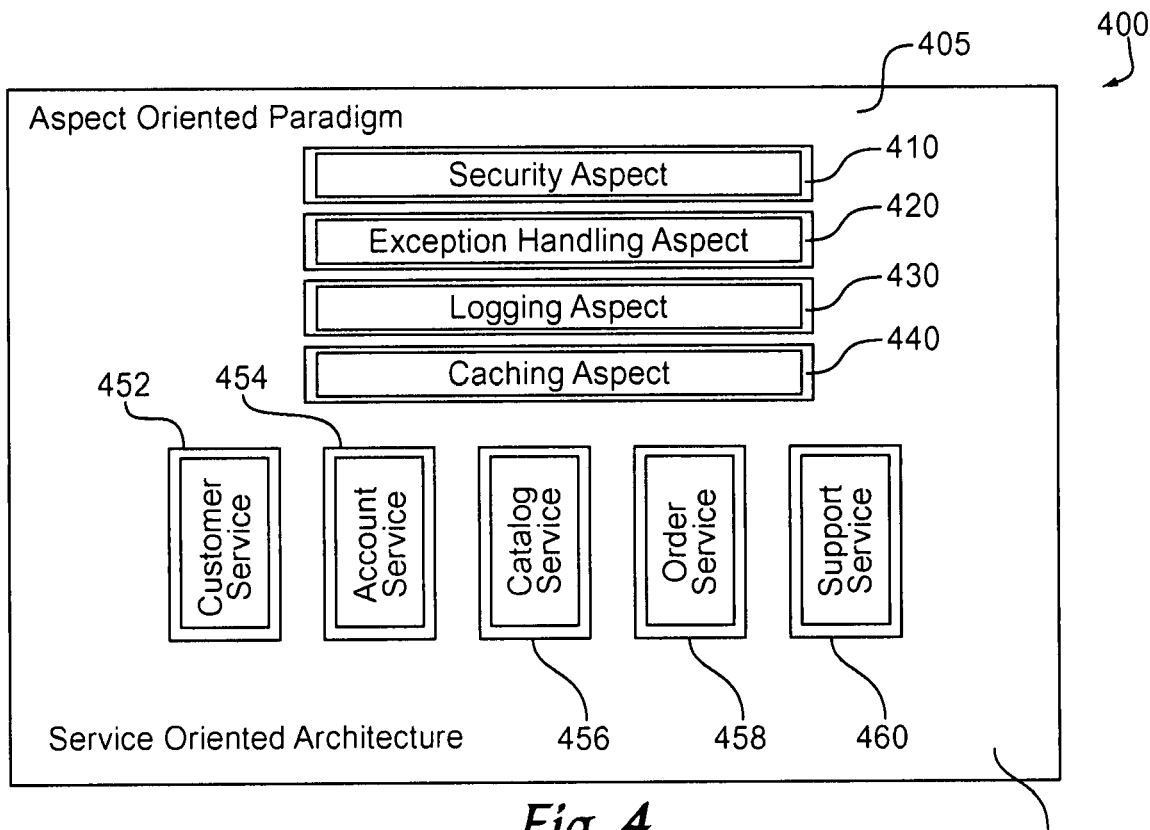
FIG. 4 is a block diagram of an architecture for providing for the separate component layers of FIG. 3.

FIG. 4 is a block diagram of an architecture 400 for providing for the separate component layers of FIG. 3. An aspect oriented programming (AOP) 405 may allow management of common requirements, such as security 410, exception handling 420, logging 430 and caching 440, to varying services. The use of AOP 405 may allow for a centralized, common code for varying components instead of spreading the extra code over the many components. The components 410, 420, 430, and 440 of the AOP 405 may run orthogonal to the service oriented architecture (SOA) 450, which may include customer service 452, account service 454, catalogue service 456, order service 458, support service 460, and any other service components. As such, some components of an application may be built following the AOP paradigm while other components may follow an implementation of the SOA approach. For example, the components (C1) built following the AOP 405 approach may encapsulate logic and/or functions that may be commonly used by a set of other application components (C2), such as the components of SOA 450, without the need of replicating the logic of components C1 within any component of C2. As such, the same application may include the benefits of both SOA 450 and AOP 405. By running orthogonal, the business logic/functions of the aspect oriented components can be applied orthogonally to any service-oriented component. Other functions and services than those shown may be used such as exception handling, logging, authentication/authorization, caching, auditing, transaction management, and data validation.

The aspect oriented paradigm 405 may be used to accommodate applications that have common, crosscutting software-related concerns. Logging is one example since the logging strategy may affect multiple parts of system. Aspect oriented programming may allow the crosscutting concerns to be managed in a centralized way, through the introduction of software components, referred to as aspects. The aspect can alter the base-code by applying additional behaviors in a determined point of the application. In this way, the strategy to manage concerns may be defined and modified with no impact on the base application code, such that changes in the aspect code may have not impact on the application code. By running the AOP 405 orthogonal to the SOA 450 the SOA 450 may create specific components with the logic to exploit service and the AOP 405 may create generic components to manage the crosscutting concerns. In one example, a customer portal AOP may be implemented in the MSC layer of FIG. 2.

Figure 5:
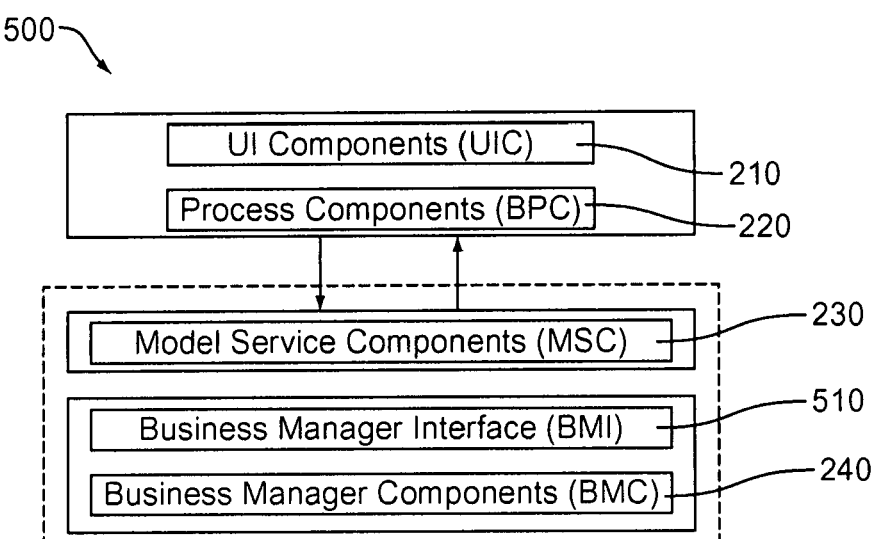
FIG. 5 is a block diagram of the layers including a model service component used to accommodate multiple, varying customer portals.

FIG. 5 is a block diagram of the layers 500 including the MSC 230 used to accommodate multiple, varying customer portals. AOP components may be implemented by leveraging frameworks such as AVANDE ACA.NET Framework Aspects, manufactured by AVANDE. The MSC 230 may connect the UIC 210 and BPC 220 to the BMC 240, such as via a business manager interface (BMI) 510. The MSC 230 may be defined as a service, such that methods may be accessed by using different transportation protocols, such as In Process, WES 2.0, ASP.NET Web Services, with low coding effort. By using the Web Services transportation protocol, it may be possible to define the business logic one time and make it available for more presentation layers and other layers, such third party applications.

Figure 6:
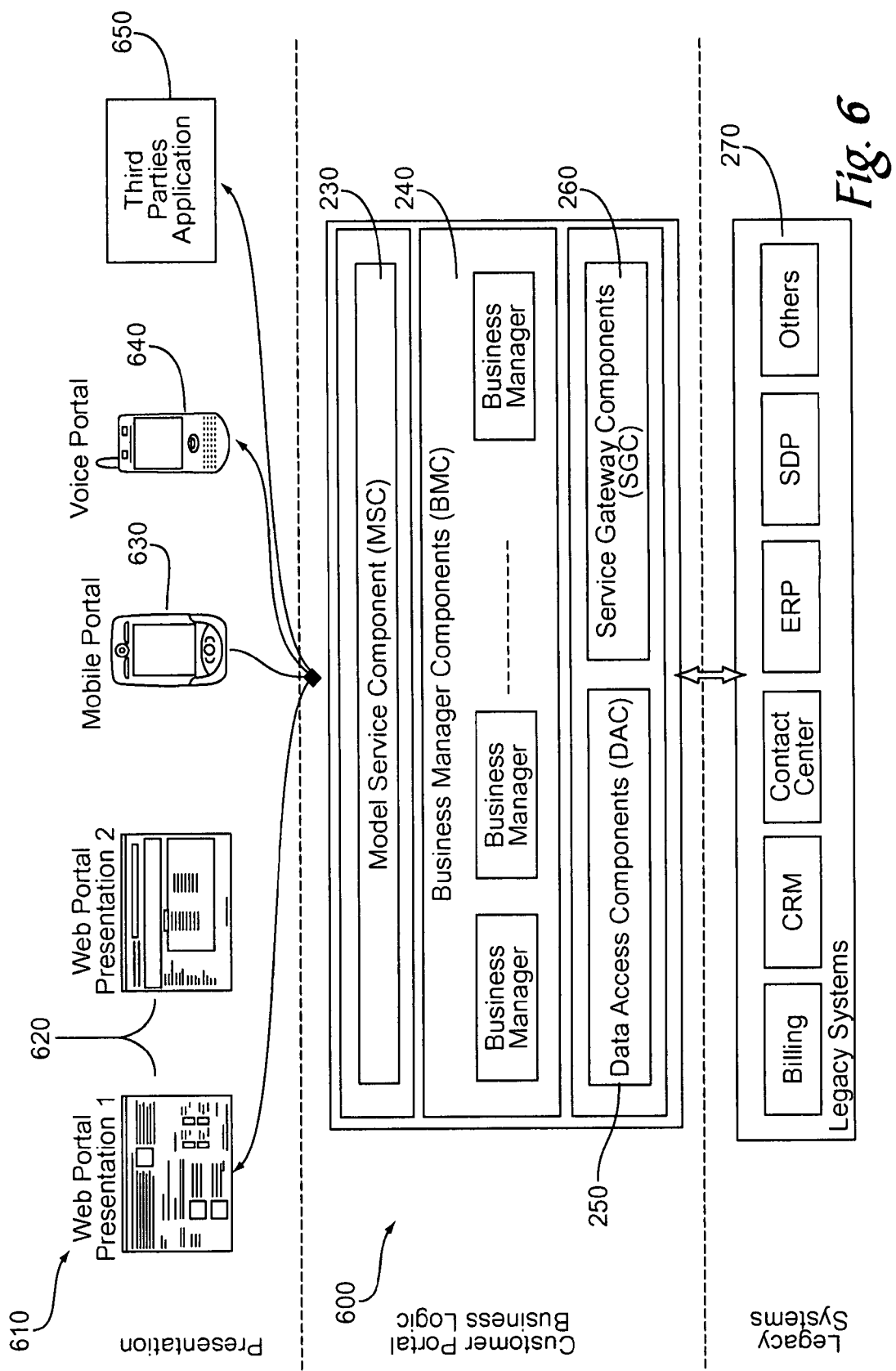
FIG. 6 is a block diagram of an implementation of the customer portal business logic.

FIG. 6 is a block diagram of an implementation of the customer portal business logic 600. The customer portal business logic may connect with varying presentation components 610 such as via web browsers 620 of different companies with varying websites. The presentation components 610 may also include mobile portal devices 630, such as personal digital assistants (PDA's), voice portals 640 such as mobile phones and Blackberry's, and third party applications 650. The MSC 230 accommodates the connection of multiple, varying devices and applications to the backend legacy systems 270 without the need to re-code the backend systems. The MSC 230 may act as a gateway to available backend system functions that can be used by different applications on different devices.

Figure 7:
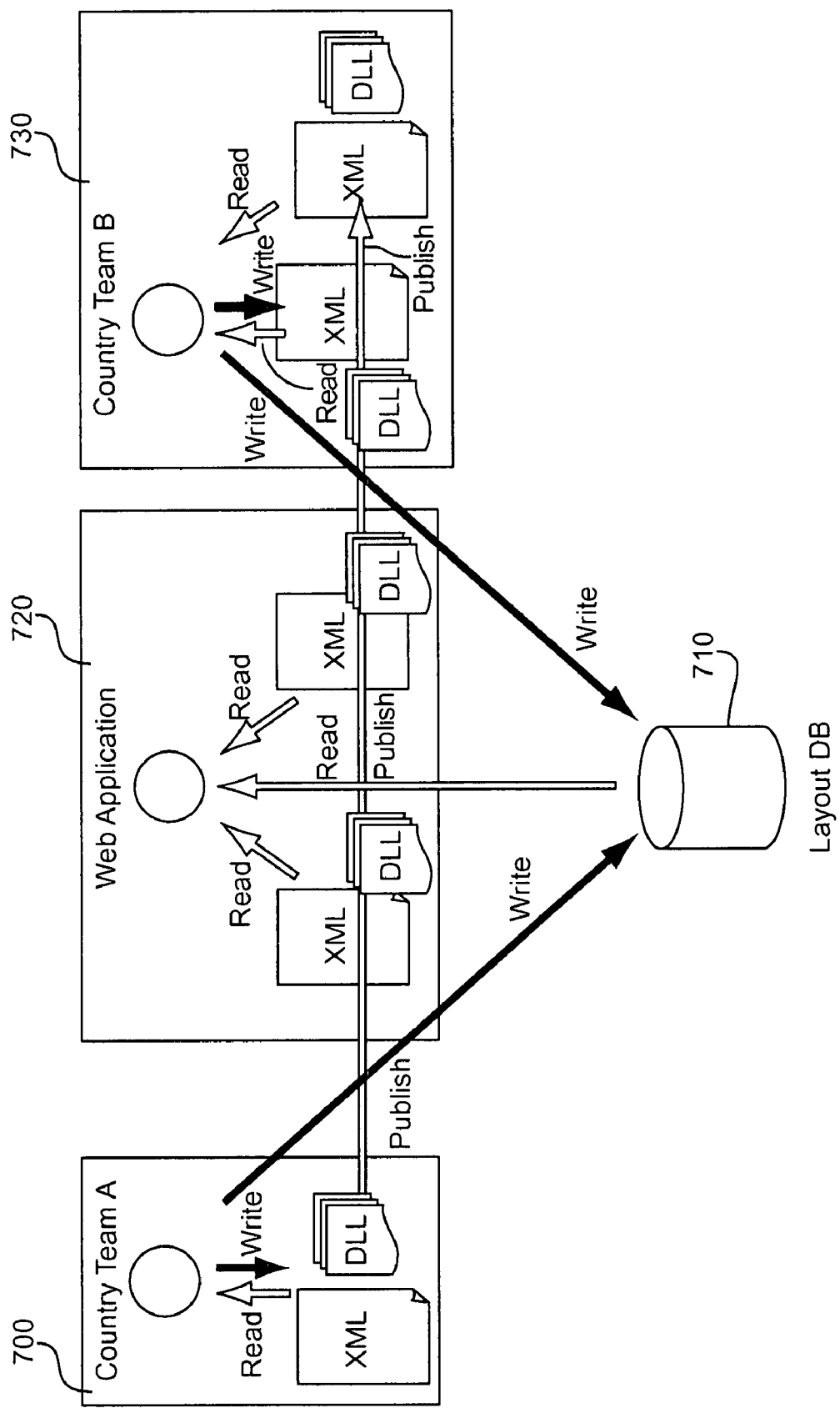
FIG. 7 is a block diagram of another implementation of the model service component.

FIG. 7 is a block diagram of another implementation of the MSC 230. The MSC 230 may allow for multi-organization development of applications, such as a customer portal. The MSC 230 flexible design may allow members of a team or multiple teams to build on a common application. The teams may be located in one country or in different countries located all over the World. Team A 700 may define a workflow for a first set of capabilities. A state machine configuration for these capabilities may be stored in a file, such as an extensible markup language (XML) file. The state machine paradigm (state-event-transition) may be implemented by leveraging the AVANDE ACA.NET framework and the state machine configuration may be stored in XML file. Team A 700 may define a main portal section, pages, and GUI or other components related to the first set of capabilities. Layout information may be stored in a layout database (DB) which may be shared by a web application 720 and Team B 730. The Team A 700 XML file may be provided to Team B 730, together with code libraries that define GUI or other components, event handlers and business logic code. The information may be published to Team B 730 via dynamic link library (DLL), or other files that may contain executable code and data bound to a program at load time or run time, rather than during linking.

Team B 730 may define a GUI for a second set of capabilities. Layout information may be stored in the shared layout database 710. Layout information may include the page controls/webparts displayed in each page, the page/webpart access rules, the contents of each page/webpart as labels, text, captions, etc. Team B 730 may define its own set of capabilities workflow. A state machine configuration for these capabilities may be stored in a Team B 730 XML file. The web application 720 may read the portal configuration from both Team A 700 and Team B 730 XML files. Layout configuration information may be retrieved from the layout database 710. The web application configuration may be the sum of the merged Team A 700 and Team B 730 XML configuration files. The Team A 700 and Team B 730 XML files may be published in a production environment together with the libraries that define the GUI components, event handlers and business logic code.

A particular implementation may be used as follows. A customer portal may be designed as a multi-tier web portal solution, which may be built following a set of design paradigms and patterns that may give the solution a unique value. The customer portal may be a ready to use solution for deploying web portals, which may define and implement a set of pre-packaged capabilities, integrating with disparate back-end/legacy applications seamlessly. The customer portal solution may follow and use the benefits of Service Oriented Architecture (SOA). The customer portal's characteristics may include: providing access to customer service capabilities (e.g., order, billing, trouble management, support); attracting customers to web shops, such as by making it more convenient for the customers to visit web shops; focusing point of sale (POS) such that a sales channel may be easily used by a customer; easy shopping, payment and delivery with one or more clicks; simple and user-friendly UI; easy sales and delivery process; self-service approach; deliver a superior end-to-end user experience; and speed-up time-to-market delivery of new services.

The customer portal application architecture may be built by combining together sophisticated design principles that give the solution a unique value in terms of flexibility. Design concepts defined by the solution may include: a multi-tier application/customer portal solution that may define many vertical logical application layers to separate the definition and development of 1) user interface components; 2) process components, 3) model service components, 4) business manager components, 5) service gateway components, 6) data access components, 7) business entity interface components, 8) exception handling components, and 9) session context components.

A logical separation between the layers may bring advantages and allow a great re-usability of any application component. The customer portal architecture may address emerging needs of operators, such as defining different presentations which leverages the same portal navigation and functionalities. Multiple web portals/sites may be implemented with different look & feel, which may define the same navigation logic and the same set of functionalities. By leveraging the multi-tier application architecture the presentation logic may be separated from the portal navigation logic. This may work especially well for multi-country organizations that need to have multiple web portals, e.g., one for each country, leveraging the same infrastructure. The architecture may also allow multi-channel delivery. The customer portal multi-tier application architecture may allow the delivery of the same set of functionalities through different channels such as the web, pda, mobile, voice, etc. The architecture may also define a "Portal Service Broker for Third Parties". The customer portal architecture may define a gateway to business services that can be exposed to third party applications that might need to access some of the portal services. The third parties may access the portal services through web services.

The customer portal application architecture may exploit the benefit of the SOA paradigm by delivering in the same application different business/functional capabilities that are typically exposed by different systems/applications. The application may deliver both eCare functionalities, such as customer account data modification, and eBilling functionalities, such as retrieve traffic details, integrating with different back-end systems, in this example customer care and billing, transparently to the users. Also, the mechanism adopted by the customer portal for implementing systems integration logic may include using web service technology, which may allow the solution to be platform agnostic. The customer portal solution may integrate to any application independent of the technology being used to build the systems.

The solution may also leverage the aspect oriented programming (AOP) paradigm. The customer portal application architecture may combine together the SOA paradigm and AOP paradigm in the same solution. The AOP paradigm may allow change in the way technical requirements such as logging, caching, exception handling, security, data validation, and others, are implemented, such as by way of centralized component instead of spreading this extra code in many components. Following the AOP approach, it may be possible to keep business logic/functional code separate from technical requirements code, such that a change on the technical code may not affect the business logic code.

The AOP approach may be orthogonally related to the SOA approach and the customer portal application may be able to combine the two design approaches. The solution may address the problem of having a ready to use web portal deliver sophisticated self-service functionalities. The customer portal may deliver a set of high valuable functionalities and a superior user experience.

The functionalities may target the growing business needs of multi-country organizations to have different teams/countries developing the core business functions of the portal and the country-specific localization of the portal user interface. The customer portal architecture may be flexible and scalable. The customer portal integration may be platform agnostic, since it may leverage web services for integration with other applications. The solution may be leveraged by client teams for delivering to clients a web portal solution for e2e self-service. Value may be derived by the innovation as a saving of the total effort required to implement and deliver a complex solution such as that enabled by reusing the asset. The customer portal may a ready-to-use solution to be deployed on to clients.

Figure 8:
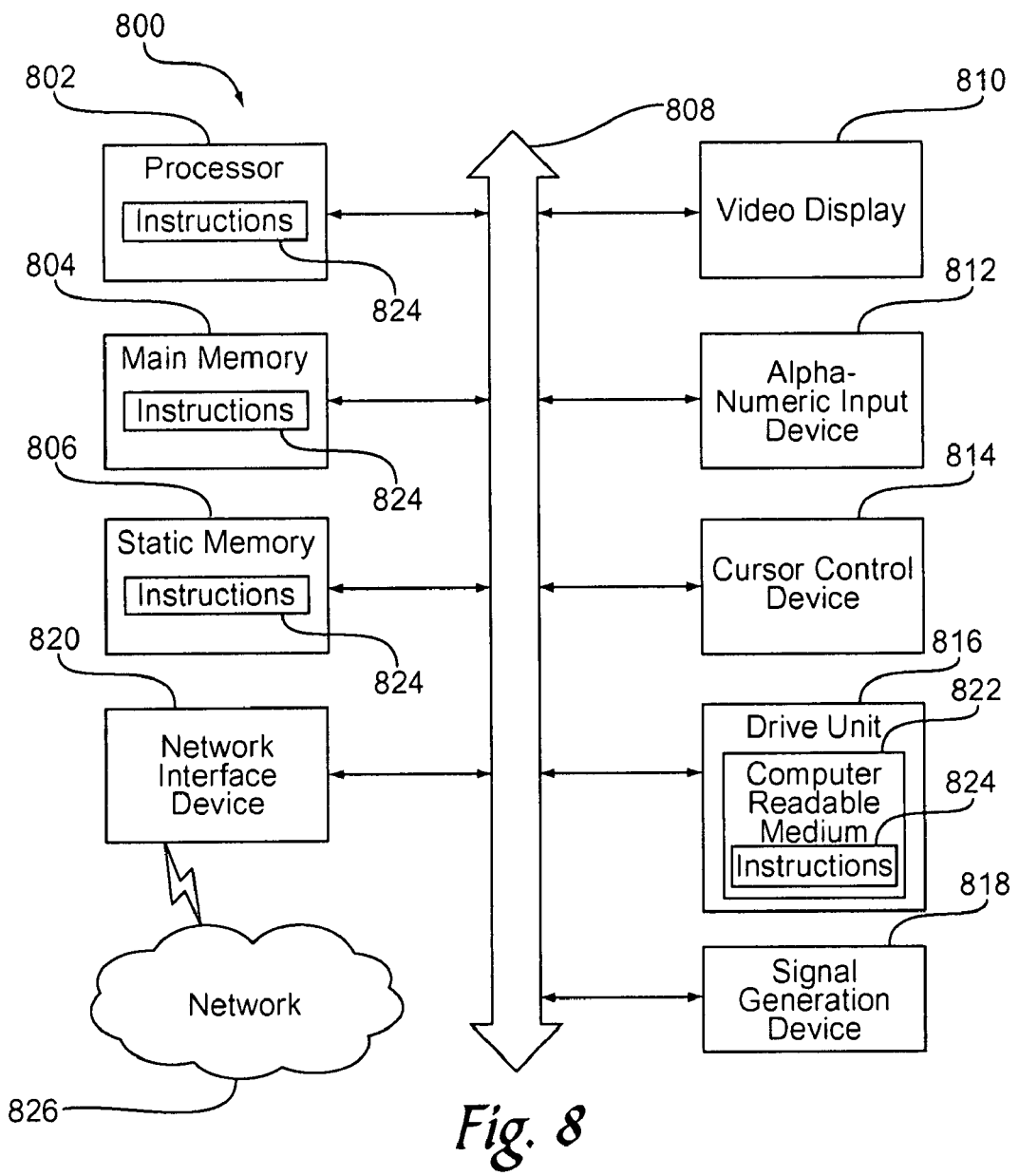
FIG. 8 is a block diagram of an exemplary general computer system.

FIG. 8 is a block diagram of an exemplary general computer system 800 that may be used with to implement one or more of the above. The computer system 800 may include a set of instructions that can be executed to cause the computer system 800 to perform any one or more of the methods or computer based functions disclosed herein. The computer system 800 may operate as a standalone device or may be connected, e.g., using a network, to other computer systems or peripheral devices. The tool may be implemented hardware, software or firmware, or any combination thereof. Alternative software implementations may be used including, but not limited to, distributed processing or component/object distributed processing, parallel processing, or virtual machine processing may also be constructed to implement the tools described herein.

In a networked deployment, the computer system 800 may operate in the capacity of a server or as a client user computer in a server-client user network environment, or as a peer computer system in a peer-to-peer (or distributed) network environment. The computer system 800 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing a set of instructions (sequential or otherwise) that specify actions to be taken by that machine. The computer system 800 may be implemented using electronic devices that provide voice, video or data communication. Further, while a single computer system 800 is illustrated, the term "system" shall also be taken to include any collection of systems or subsystems that individually or jointly execute a set, or multiple sets, of instructions to perform one or more computer functions.

The computer system 800 may include a processor 802, e.g., a central processing unit (CPU), a graphics processing unit (GPU), or both. Moreover, the computer system 800 may include a main memory 804 and a static memory 806 that may communicate with each other via a bus 808. The computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 may also include a disk drive unit 816, a signal generation device 818, such as a speaker or remote control, and a network interface device 820.

The disk drive unit 816 may include a computer-readable medium 822 in which one or more sets of instructions 824, e.g. software, may be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

Dedicated hardware implementations, such as application specific integrated circuits, programmable logic arrays and other hardware devices, may be constructed to implement one or more of the tools described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit.

The present disclosure contemplates a computer-readable medium that includes instructions 824 or receives and executes instructions 824 responsive to a propagated signal, so that a device connected to a network 826 may communicate voice, video or data over the network 826. Further, the instructions 824 may be transmitted or received over the network 826 via the network interface device 820. While the computer-readable medium is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding or carrying a set of instructions for execution by a processor or that cause a computer system to perform any one or more of the methods or operations disclosed herein.

The computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, is apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A portal system, comprising:
a user interface component;
process components;
a business manager component implementing business functions as services and comprising business logics;
a computer processor for executing a model service component, the model service component being arranged between a presentation device and the business manager component and separating the user interface component and the process components from the business manager component;
wherein the model service component implements common logic and common functionality with an aspect oriented architecture having aspect components associated with the model service component;
wherein the business manager component is arranged to use the common logic and the common functionality provided by the aspect components, the business manager component configured with a service oriented architecture and
wherein by running the aspect oriented architecture and the service oriented architecture, the service oriented architecture creates a specific logic to exploit service and the aspect oriented architecture creates generic components to manage the service;
a business manager interface, the business manager interface being arranged between the business manager component and the model service component;
wherein the model service component is arranged to connect the user interface component and the process components to the business manager component through the business manager interface by using a web services transportation protocol.

2. The system of claim 1 wherein the aspect oriented architecture comprises security, exception handling, logging and caching aspects.

3. The system of claim 1 wherein the service oriented architecture comprises support, order, catalogue, account and customer services.

4. The system of claim 1 wherein the presentation device comprises web and mobile portals.

5. The system of claim 1 further including legacy systems, wherein the business manager component connects the model service component to the legacy systems.

6. The system of claim 1 further including a layout database for storing data, wherein the data comprises layout information.

7. The system of claim 6 wherein the layout information comprises information about different portals, the information comprising: webparts displayed, webpart access rules, and contents of webparts.

8. The system of claim 6 further comprising a web application, wherein the web application reads the data from the layout database.

9. The system of claim 6 wherein at least two entities which are located in different locations contribute to the layout database, the entities comprising a plurality of users.

10. The system of claim 9 wherein the entities define a state machine to be shared via a dynamic link library.

11. A model service component for connecting different portals to legacy systems, comprising:
a computer processor for executing the model service component;
an aspect oriented architecture means having aspect components, the aspect components implementing common logic and common functionality; and
a service oriented architecture means having service components, the service components being arranged to use the common logic and the common functionality provided by the aspect components, the service components comprising a specific logic to exploit service;
wherein by running the aspect oriented architecture and the service oriented architecture, the service oriented architecture creates the specific logic to exploit service and the aspect oriented architecture creates generic components to manage the service;
where the model service component is arranged to connect a user interface component and process components to a business manager component through a business manager interface by using a web services transportation protocol, the model service component separating the user interface component and the process components from the business manager component.

12. The model service component of claim 11 wherein the aspect oriented architecture means comprises security, exception handling, logging and caching aspects.

13. The model service component of claim 11 wherein the service oriented architecture means comprises support, order, catalogue, account and customer services.

14. The model service component of claim 11 wherein the aspect oriented architecture means and service oriented architecture means connects the different portals to the legacy systems.

15. The model service component of claim 11 further including a layout database means for storing data, wherein the data comprises layout information.

16. The model service component of claim 15 wherein the layout information comprises information about the different portals, the information comprising: webparts displayed, webpart access rules, and contents of webparts.

17. The model service component of claim 15 further comprising a web application means, wherein the web application means reads the data from the layout database means.

18. The model service component of claim 15 wherein at least two entities which are located in different locations contribute to the layout database means, the entities comprising a plurality of users.

19. The model service component of claim 18 wherein the entities define a state machine to be shared via a dynamic link library.

* * * * *